United States Patent [19]

Sakamoto et al.

[11] Patent Number: 5,773,040

[45] Date of Patent: Jun. 30, 1998

[54] DISC MOLDING DIE

[75] Inventors: Yasuyoshi Sakamoto, Kamagaya; Akira Hatano, Ichihara, both of Japan

[73] Assignees: Seikoh Giken Co., Ltd.; Sumitomo Heavy Industries, Ltd., both of Japan

[21] Appl. No.: 866,115

[22] Filed: May 30, 1997

[51] Int. Cl.$^6$ .................................................. B29C 45/10
[52] U.S. Cl. .................... 425/192 R; 249/102; 249/155; 249/156; 425/810
[58] Field of Search ............................... 425/183, 192 R, 425/810; 249/102, 156, 155

[56] References Cited

U.S. PATENT DOCUMENTS

| | | | |
|---|---|---|---|
| 3,363,039 | 1/1968 | Nagai et al. | 249/156 |
| 4,715,804 | 12/1987 | Takahashi | 425/810 |
| 5,427,520 | 6/1995 | Shimizu et al. | 425/810 |
| 5,464,339 | 11/1995 | Arakawa et al. | 425/192 R |
| 5,593,710 | 1/1997 | Asai | 425/810 |
| 5,607,705 | 3/1997 | Asai | 425/192 R |
| 5,662,948 | 9/1997 | Sjoberg | 249/155 |

*Primary Examiner*—Robert Davis
*Attorney, Agent, or Firm*—Lorusso & Loud

[57] ABSTRACT

In a disc molding die, a stationary base plate is attached to a stationary platen, and a stationary mirror-surface plate is attached to the stationary base plate. Further, a movable base plate is attached to a movable platen, and a movable mirror-surface plate is attached to the movable base plate. A stationary guide ring is attached to the stationary base plate so as to surround the stationary mirror-surface plate, while a movable guide ring is attached to the movable base plate so as to surround the movable mirror-surface plate. When the die is clamped, the movable guide ring is brought into contact with the stationary guide ring. A cavity ring is detachably attached to one of the stationary and movable mirror-surface plates such that the cavity ring projects toward the other of the stationary and movable mirror-surface plates. An abutment position adjusting mechanism adjusts the abutment position where the movable guide ring abuts on the stationary guide ring, in accordance with the thickness of the cavity ring. This makes it possible to change the thickness of the cavity without replacing the mirror-surface plates.

4 Claims, 6 Drawing Sheets

DISC MOLDING DIE

BACKGROUND OF THE INVENTION

1. Field of the Invention

The present invention relates to a disc molding die.

2. Description of the Related Art

Conventionally, when a product is molded in an injection molding machine, resin supplied to a heating cylinder is heated and melted therein and then charged into a cavity formed in a die. The molten resin is then cooled and hardened to obtain the molded product.

In the case where products to be molded are discs such as optical disc substrates, resin supplied to the heating cylinder is heated and melted therein and then charged into a cavity formed in a disc molding die. The molten resin is then cooled and hardened to obtain the molded products.

The disc molding die is composed of a stationary die assembly and a movable die assembly. A die clamping apparatus causes a movable mirror-surface plate of the movable die assembly to contact with and separate from a stationary mirror-surface plate of the stationary die assembly, thereby performing die closing, die clamping, and die opening.

However, in the conventional disc molding die, the mirror-surface plates must be replaced whenever discs having a different thickness are to be molded.

Therefore, the mirror-surface plates must be made for each kind of disc. In addition, since discs are required to have excellent optical characteristics, accuracy of the mirror-surface plates, as measured by, for example, surface roughness and dimensional accuracy, must be increased. As a result, the cost of the disc molding die increases and a prolonged period of time is required to manufacture the disc molding die.

Moreover, for replacement of the mirror-surface plates, the following operations must be carried out: First, the stationary die assembly and the movable die assembly are removed from the die clamping apparatus, and the respective mirror-surface plates are then replaced with other mirror-surface plates. Subsequently, the stationary die assembly and the movable die assembly are attached to the die clamping apparatus. In addition, the replacement of the mirror-surface plates requires disconnection and reconnection of pipes for water, air, etc. Accordingly, the operations involved in the replacement of the mirror-surface plates are troublesome and greatly decrease the productivity of the injection molding machine.

SUMMARY OF THE INVENTION

An object of the present invention is to solve the above-mentioned problems in the conventional disc molding die and to provide a disc molding die which can eliminate the necessity of making different mirror-surface plates for each kind of disc in order to lower the cost and to shorten the manufacturing period and can simplify the operations in order to improve the productivity of the injection molding machine.

To achieve the above object, a disc molding die according to the present invention comprises a stationary platen; a movable platen disposed so as to face the stationary platen and adapted to be advanced and retracted by a die clamping apparatus; a stationary base plate attached to the stationary platen; a movable base plate attached to the movable platen; a stationary mirror-surface plate attached to the stationary base plate; a movable mirror-surface plate attached to the movable base plate; a stationary guide ring attached to the stationary base plate so as to surround the stationary mirror-surface plate; a movable guide ring attached to the movable base plate so as to surround the movable mirror-surface plate and adapted to contact with the stationary guide ring in a die clamp state; a cavity ring detachably attached to one of the stationary and movable mirror-surface plates such that the cavity ring projects toward the other of the stationary and movable mirror-surface plates; and abutment position adjusting means for adjusting a position where the movable guide ring abuts on the stationary guide ring, in accordance with the thickness of the cavity ring.

When the movable platen is advanced by the die clamping apparatus, the cavity ring attached to one of the stationary and movable mirror-surface plates abuts on the other of the stationary and movable mirror-surface plates, so that a cavity is formed.

When the cavity ring is replaced with a different one having a different thickness, the abutment position of the guide rings is adjusted by the abutment position adjusting means in accordance with the thickness of the newly attached cavity ring. This allows the thickness of the cavity to be changed without replacement of the mirror-surface plates.

Since it is unnecessary to make mirror-surface plates for each kind of disc, the cost of the disc molding die can be lowered, and the period of time required to manufacture the disc molding die can be shortened.

In addition, it is unnecessary to remove the stationary and movable die assemblies from the die clamping apparatus and attach different stationary and movable die assemblies to the die clamping apparatus, and to disconnect and reconnect pipes for water, air, etc., in order to adjust the abutment position of the guide rings by the abutment position adjusting means. Accordingly, the operations can be simplified and the productivity of the injection molding machine can be improved.

In another disc molding die according to the present invention, the abutment position adjusting means is a guide ring spacer that is removably disposed between the guide ring and the base plate.

In this case, when the cavity ring is replaced with a different one having a different thickness, the guide ring spacer is attached or removed in accordance with the thickness of the newly attached cavity ring. This allows the thickness of the cavity to be changed without replacement of the mirror-surface plates.

In still another disc molding die according to the present invention, the abutment position adjusting means is a guide ring spacer that is removably disposed between the guide rings.

In this case, when the cavity ring is replaced with a different one having a different thickness, the guide ring spacer is attached or removed in accordance with the thickness of the newly attached cavity ring. This allows the thickness of the cavity to be changed without replacement of the mirror-surface plates.

Still another disc molding die according to the present invention comprises a stationary platen; a movable platen disposed so as to face the stationary platen and adapted to be advanced and retracted by a die clamping apparatus; a stationary base plate attached to the stationary platen; a movable base plate attached to the movable platen; a stationary mirror-surface plate attached to the stationary base plate; a movable mirror-surface plate attached to the movable base plate; a stationary guide ring attached to the stationary base plate so as to surround the stationary mirror-surface plate; a movable guide ring attached to the movable base plate so as to surround the movable mirror-surface plate and adapted to contact with the stationary guide ring in a die clamp state; and a cavity ring detachably attached to one of the stationary and movable mirror-surface plates such that the cavity ring projects toward the other of the stationary and movable mirror-surface plates.

The guide ring is replaced with a different one in accordance with the thickness of the cavity ring so as to adjust the abutment position of the guide ring.

In this case, when the cavity ring is replaced with a different one having a different thickness, one of the guide rings is replaced with a different one in accordance with the thickness of the newly attached cavity ring. This allows the thickness of the cavity to be changed without replacement of the mirror-surface plates.

BRIEF DESCRIPTION OF THE DRAWINGS

The structure and features of the disc molding die according to the present invention will be readily appreciated as the same becomes better understood by referring to the accompanying drawings, in which.

DESCRIPTION OF PREFERRED EMBODIMENT

Embodiments of the present invention will next be described in detail with reference to the drawings.

Figure 1:
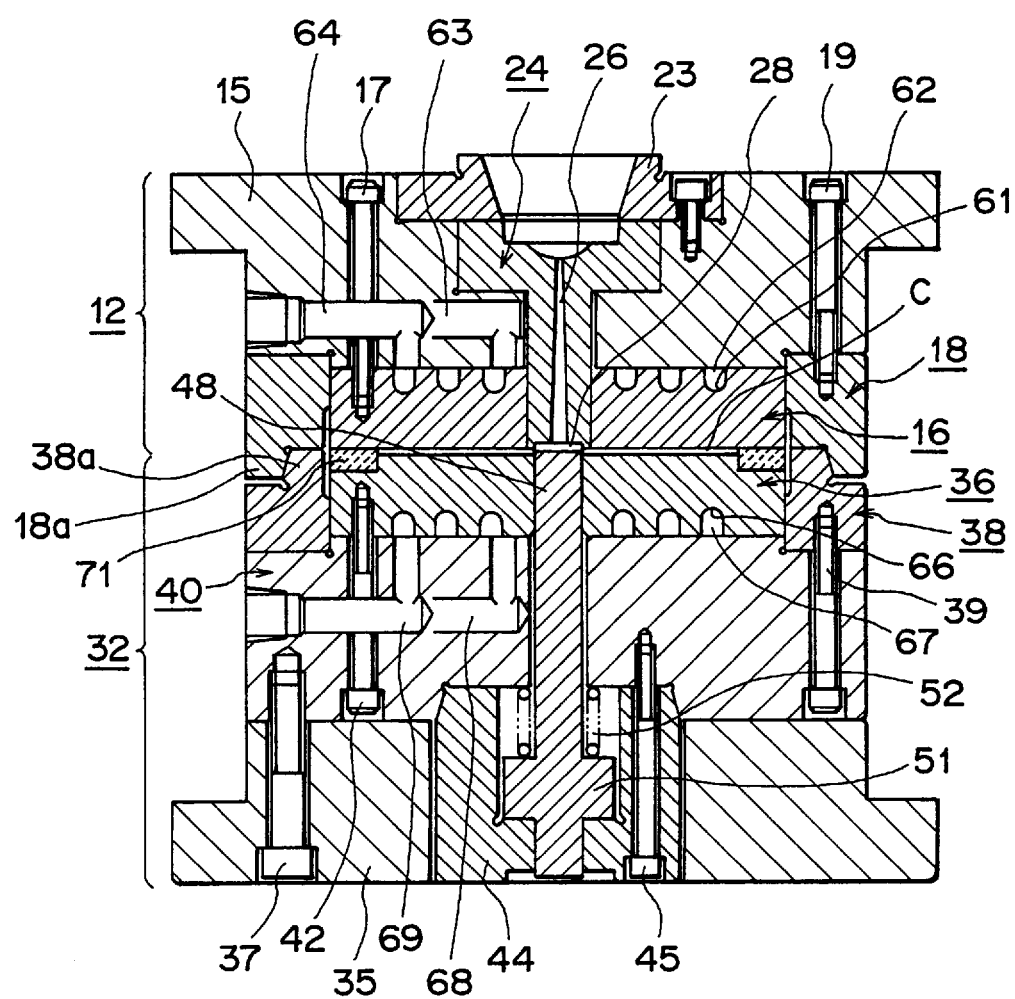
FIG. 1 is a sectional view of a disc molding die according to a first embodiment of the present invention.

FIG. 1 is a sectional view of a disc molding die according to a first embodiment of the present invention.

In FIG. 1, numeral 12 denotes a stationary die assembly that is attached to an unillustrated stationary platen with bolts. The stationary die assembly 12 is composed of a base plate 15, a mirror-surface plate 16 fixed to the base plate 15 with bolts 17, an annular guide ring 18 disposed to surround the mirror-surface plate 16 and fixed to the base plate 15 with bolts 19, a locating ring 23 that is disposed on the stationary-platen side of the base plate 15 so as to locate the base plate 15 with respect to the stationary platen, and a sprue bush 24 disposed adjacent to the locating ring 23.

At the center of the sprue bush 24 is formed a sprue 26 through which resin injected from an unillustrated injection nozzle passes. The sprue bush 24 is disposed such that its tip end faces a cavity C, and a cut die 28 is formed in the end surface of the sprue bush 24.

Moreover, unillustrated stamper plate attachment/removal bushes, a stationary-side air-blow bush, and the like are disposed on the stationary die assembly 12.

Numeral 32 denotes a movable die assembly that is attached to an unillustrated movable platen with bolts. The movable die assembly 32 is composed of a base plate 35, an intermediate plate 40 fixed to the base plate 35 with bolts 37, a mirror-surface plate 36 fixed to the intermediate plate 40 with bolts 42, an annular guide ring 38 disposed to surround the mirror-surface plate 36 and fixed to the intermediate plate 40 with bolts 39, a cylinder 44 that is disposed within the base plate 35 so as to face the movable platen and fixed to the base plate 35 with bolts 45, and a cut punch 48 that is advanced and retracted by the cylinder 44 and that has a shape corresponding to the cut die 28.

Moreover, on the surface of the mirror-surface plate 36 facing the mirror-surface plate 16 is disposed an annular cavity ring 71 that extends along the outer circumferential edge of the surface. The annular cavity ring 71 is fixed to the mirror-surface plate 36 with unillustrated bolts and projects toward the mirror-surface plate 16 by an amount corresponding to the thickness of a disc to be molded. As a result, a concave portion is formed on the radially inner-side of the cavity ring 71. When the movable platen is moved toward the stationary platen through an operation of an unillustrated die clamping apparatus and the cavity ring 71 is brought into contact with the mirror-surface plate 16, the concave portion forms the cavity C.

A piston 51 integrally formed with the cut punch 48 is reciprocatively disposed within the cylinder 44. An oil chamber is formed on the rear side (movable-platen side) of the piston 51. On the front side (upper side in FIG. 1) of the piston 51, a cut-punch returning spring 52 is disposed in order to urge the piston 51 rearward.

In the disc molding die having the above-described structure, when the movable platen is moved toward the stationary platen through operation of the die clamping apparatus, the guide ring 38 coincides with the guide ring 18, so that the cavity ring 71 is centered with respect to the mirror-surface plate 16, therby performing the die clamping. In the die clamp state, molten resin is charged into the cavity C via the sprue 26, and is then cooled and hardened to obtain a molded product.

In order to coincide the guide ring 38 with the guide ring 18 as described above, an annular projection 18a is formed on the guide ring 18 at its outer circumferential side, while an annular projection 38a is formed on the guide ring 38 at its inner circumferential side.

Subsequently, when the piston 51 is advanced (moved upward in FIG. 1) by supplying an oil to the above-mentioned oil chamber, the cut punch 48 is advanced, so that the tip end of the cut punch 48 enters the cut die 28. As a result, a hole is formed in the product in the cavity C, whereby the center portion of the disc is removed.

Unillustrated ejector bushes, ejector pins, a movable-side air-blow bush, and the like are also disposed on the movable die assembly 32.

In the surface of the mirror-surface plate 16, which surface faces the base plate 15, grooves 61 is formed in an appropriate pattern. The grooves 61 are covered by the base plate 15 so as to form cooling water passages 62. The cooling water passages 62 are connected to an unillustrated cooling water system via an inlet manifold 63 and an outlet manifold 64.

Similarly, in the surface of the mirror-surface plate 36, which surface faces the intermediate plate 40, grooves 66 are formed in an appropriate pattern. The grooves 66 are covered by the intermediate plate 40 so as to form cooling water passages 67. The cooling water passages 67 are connected to the cooling water system via an inlet manifold 68 and an outlet manifold 69.

In order to prevent cooling water from leaking from the cooling water passages 62 and 67, the inlet manifolds 63 and 68, and the outlet manifolds 64 and 69, sealing is provided by unillustrated O-rings.

In the disc molding die having the above-described structure, different discs having different thicknesses can be molded without replacinng the mirror-surface plate 16, the cut die 28, etc. of the stationary die assembly 12 and the mirror-surface plate 36, the cut punch 48, etc. of the movable die assembly 32. To this end, the thickness of the cavity ring 71 can be changed, and abutment position adjusting means is provided so as to adjust the abutment position between the guide rings 18 and 38 in accordance with the thickness of the cavity ring 71.

Figure 2:
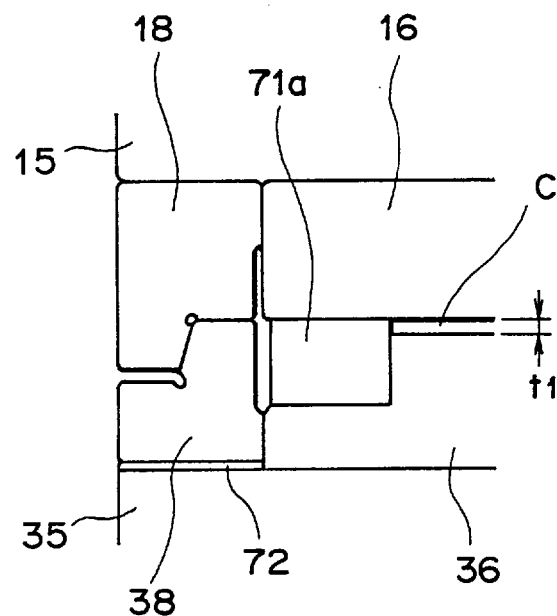
FIG. 2 is a view showing a first state of the abutment position adjusting means in the first embodiment of the present invention.
Figure 3:
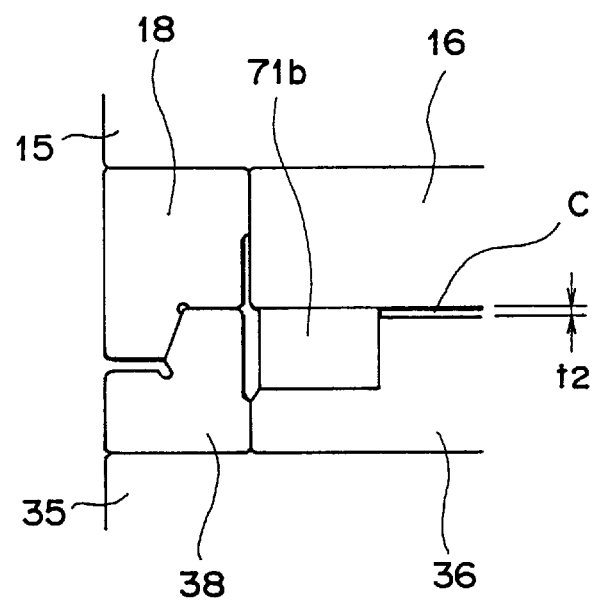
FIG. 3 is a view showing a second state of the abutment position adjusting means in the first embodiment of the present invention.

FIG. 2 is a view showing a first state of the abutment position adjusting means in the first embodiment of the present invention, and FIG. 3 is a view showing a second state of the abutment position adjusting means in the first embodiment of the present invention.

In these drawings, numerals 15 and 35 denote the base plates, numerals 16 and 36 denote the mirror-surface plates, numerals 18 and 38 denote the guide rings, numeral 71*a* denotes a thick-type cavity ring, numeral 71*b* denotes a thin-type cavity ring, and numeral 72 denotes an annular guide ring spacer. The guide ring spacer 72 serves as the abutment position adjusting means.

When a disc to be molded is thick, the cavity ring 71*a* is attached to the mirror-surface plate 36, and the guide ring spacer 72 is disposed between the guide ring 38 and the base plate 35, as shown in FIG. 2. As a result, the amount of projection of the cavity ring 71*a* from the mirror-surface plate 36 increases, so that the thickness of the cavity C becomes t1.

When a disc to be molded is thin, the cavity ring 71*b* is attached to the mirror-surface plate 36, and the guide ring 38 is brought into close contact with the base plate 35, as shown in FIG. 3. As a result, the amount of projection of the cavity ring 71*b* from the mirror-surface plate 36 decreases, so that the thickness of the cavity C becomes t2.

As described above, when the cavity rings 71*a* and 72*b* having different thicknesses are used, the abutment position between the guide rings 18 and 38 is adjusted by the guide ring spacer 72 in accordance with the thickness of the cavity ring 71*a* or 72*b*. As a result, the thickness of the cavity C can be changed without replacing the mirror-surface plates 16 and 36.

Since it is unnecessary to make the mirror-surface plates 16 and 36 for each kind of disc, the cost of the disc molding die can be lowered, and the period of time required to manufacture the disc molding die can be shortened.

In addition, it is unnecessary to remove the stationary and movable die assemblies 12 and 32 from the die clamping apparatus and attach different stationary and movable die assemblies to the die clamping apparatus, and to disconnect and reconnect pipes for water, air, etc., in order to dispose the guide ring spacer 72. Accordingly, the operations can be simplified and the productivity of the injection molding machine can be improved.

Next, a second embodiment of the present invention will be described.

Figure 4:
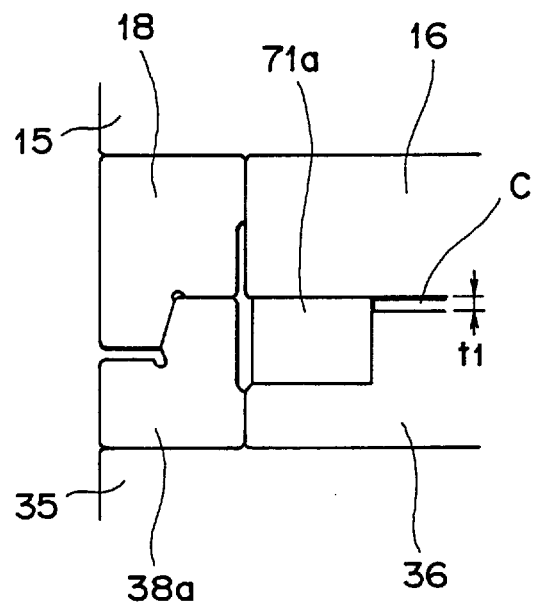
FIG. 4 is a view showing a first state of the disc moldig die in a second embodiment of the present invention.
Figure 5:
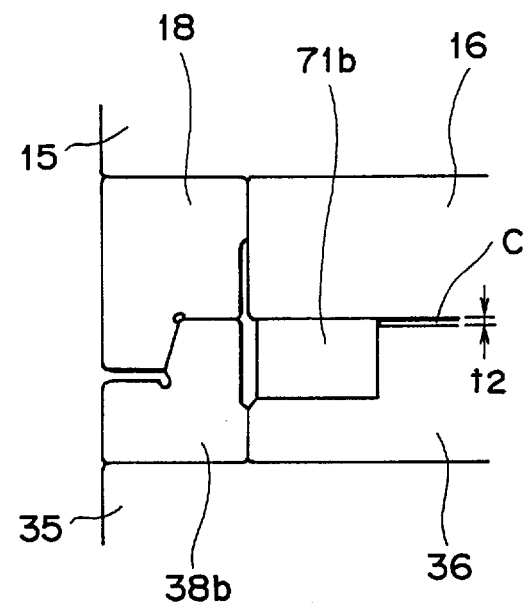
FIG. 5 is a view showing a second state of the disc molding die in the second embodiment of the present invention.

FIG. 4 is a view showing a first state of the disc molding die in the second embodiment of the present invention; and FIG. 5 is a view showing a second state of the disc molding die in the second embodiment of the present invention.

In these drawings, numerals 15 and 35 denote the base plates, numerals 16 and 36 denote the mirror-surface plates, numeral 18 denotes the guide ring, numeral 38*a* denotes a thick-type guide ring, numeral 38*b* denotes a thin-type guide ring, numeral 71*a* denotes the thick-type cavity ring, and numeral 71*b* denotes the thin-type cavity ring.

When a disc to be molded is thick, the cavity ring 71*a* is attached to the mirror-surface plate 36, and the guide ring 38*a* is attached to the base plate 35, as shown in FIG. 4. As a result, the amount of projection of the cavity ring 71*a* from the mirror-surface plate 36 increases, so that the thickness of the cavity C becomes t1.

When a disc to be molded is thin, the cavity ring 71*b* is attached to the mirror-surface plate 36, and the guide ring 38*b* is attached to the base plate 35, as shown in FIG. 5. As a result, the amount of projection of the cavity ring 71*b* from the mirror-surface plate 36 decreases, so that the thickness of the cavity C becomes t2.

Next, a third embodiment of the present invention will be described.

Figure 6:
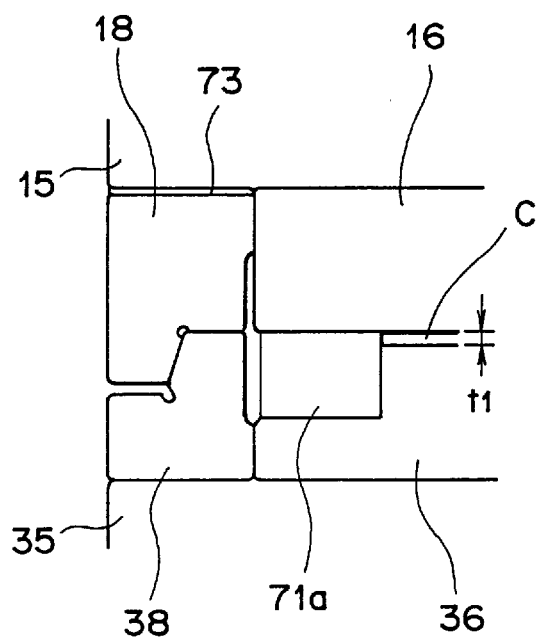
FIG. 6 is a view showing a first state of the abutment position adjusting means in a third embodiment of the present invention.
Figure 7:
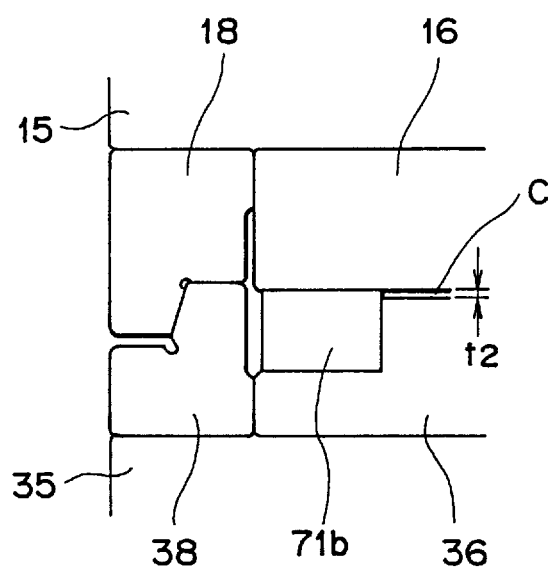
FIG. 7 is a view showing a second state of the abutment position adjusting means in the third embodiment of the present invention.

FIG. 6 is a view showing a first state of the abutment position adjusting means in the third embodiment of the present invention, and FIG. 7 is a view showing a second state of the abutment position adjusting means in the third embodiment of the present invention.

In these drawings, numerals 15 and 35 denote the base plates, numerals 16 and 36 denote the mirror-surface plates, numerals 18 and 38 denote the guide rings, numeral 71*a* denotes the thick-type cavity ring, numeral 71*b* denotes the thin-type cavity ring, and numeral 73 denotes an annular guide ring spacer. The guide ring spacer 73 serves as the abutment position adjusting means.

When a disc to be molded is thick, the cavity ring 71*a* is attached to the mirror-surface plate 36, and the guide ring spacer 73 is disposed between the guide ring 18 and the base plate 15, as shown in FIG. 6. As a result, the amount of projection of the cavity ring 71*a* from the mirror-surface plate 36 increases, so that the thickness of the cavity C becomes t1.

When a disc to be molded is thin, the cavity ring 71*b* is attached to the mirror-surface plate 36, and the guide ring 18 is brought into close contact with the base plate 15, as shown in FIG. 7. As a result, the amount of projection of the cavity ring 71*b* from the mirror-surface plate 36 decreases, so that the thickness of the cavity C becomes t2.

Next, a fourth embodiment of the present invention will be described.

Figure 8:
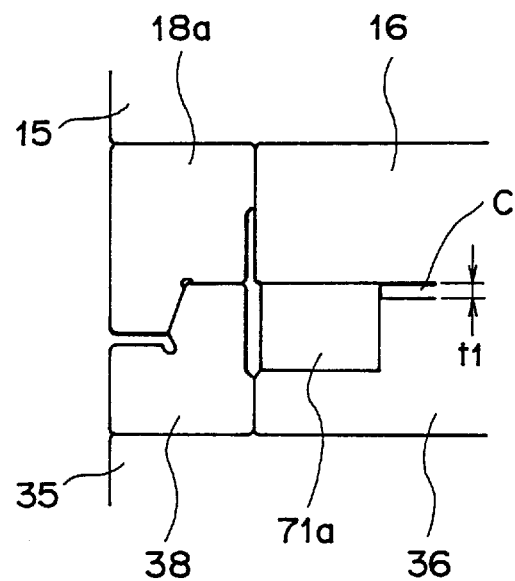
FIG. 8 is a view showing a first state of the abutment position adjusting means in a fourth embodiment of the present invention.
Figure 9:
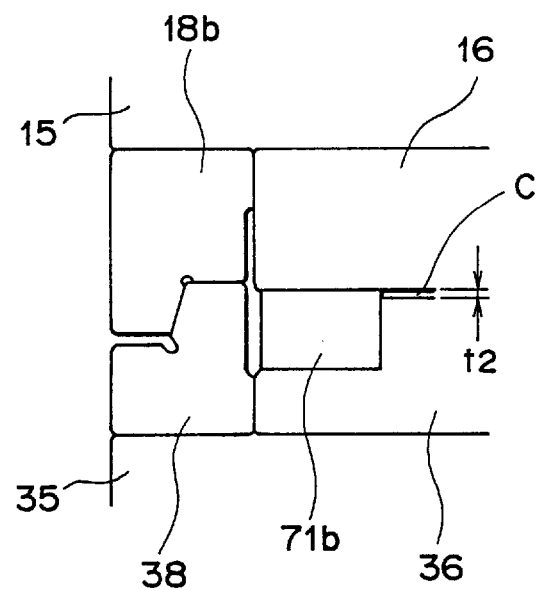
FIG. 9 is a view showing a second state of the abutment position adjusting means in the fourth embodiment of the present invention.

FIG. 8 is a view showing a first state of the abutment position adjusting means in the fourth embodiment of the present invention, and FIG. 9 is a view showing a second state of the abutment position adjusting means in the fourth embodiment of the present invention.

In these drawings, numerals 15 and 35 denote the base plates, numerals 16 and 36 denote the mirror-surface plates, numeral 18*a* denotes a thick-type guide ring, numeral 18*b* denotes a thin-type guide ring, numeral 38 denotes the guide ring, numeral 71*a* denotes the thick-type cavity ring, and numeral 71*b* denotes the thin-type cavity ring. The guide rings 18*a* and 18*b* serve as the abutment position adjusting means.

When a disc to be molded is thick, the cavity ring 71*a* is attached to the mirror-surface plate 36, and the guide ring 18*a* is attached to the base plate 15, as shown in FIG. 8. As a result, the amount of projection of the cavity ring 71*a* from the mirror-surface plate 36 increases, so that the thickness of the cavity C becomes t1.

When a disc to be molded is thin, the cavity ring 71*b* is attached to the mirror-surface plate 36, and the guide ring 18*b* is attached to the base plate 15, as shown in FIG. 9. As a result, the amount of projection of the cavity ring 71*b* from the mirror-surface plate 36 decreases, so that the thickness of the cavity C becomes t2.

Next, a fifth embodiment of the present invention will be described.

Figure 10:
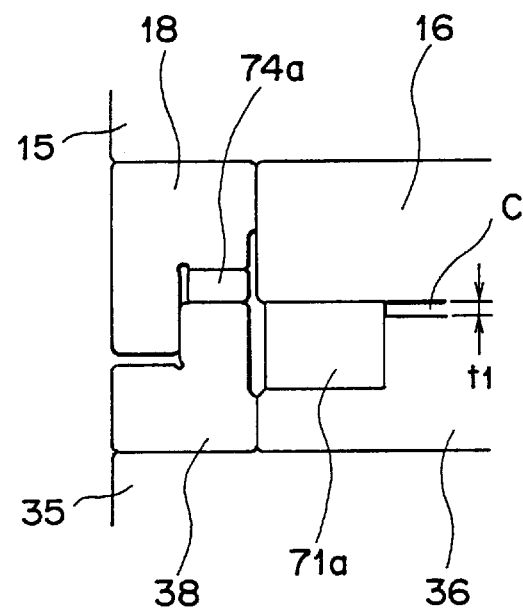
FIG. 10 is a view showing a first state of the abutment position adjusting means in a fifth embodiment of the present invention.
Figure 11:
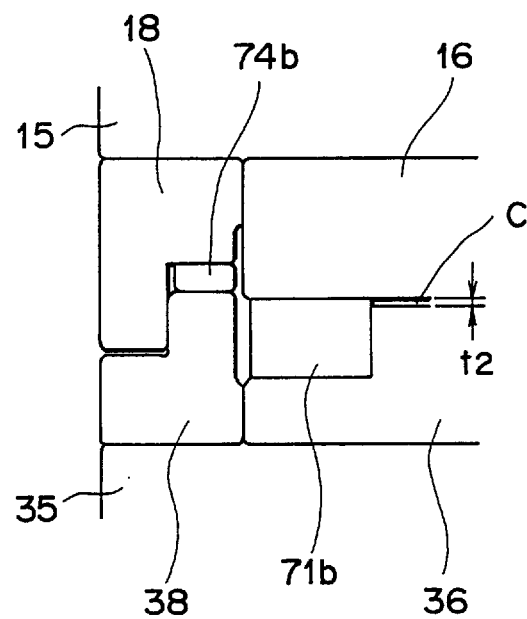
FIG. 11 is a view showing a second state of the abutment position adjusting means in the fifth embodiment of the present invention.

FIG. 10 is a view showing a first state of the abutment position adjusting means in the fifth embodiment of the present invention, and FIG. 11 is a view showing a second state of the abutment position adjusting means in the fifth embodiment of the present invention.

In these drawings, numerals 15 and 35 denote the base plates, numerals 16 and 36 denote the mirror-surface plates, numerals 18 and 38 denote the guide rings, numeral 71*a* denotes the thick-type cavity ring, numeral 71*b* denotes the thin-type cavity ring, numeral 74*a* denotes an annular thick-type guide ring spacer, and numeral 74*b* denotes an annular thin-type guide ring spacer. The guide ring spacers 74*a* and 74*b* serve as the abutment position adjusting means.

When a disc to be molded is thick, the cavity ring 71*a* is attached to the mirror-surface plate 36, and the guide ring spacer 74*a* is attached to the guide ring 18, as shown in FIG. 10. As a result, the amount of projection of the cavity ring 71*a* from the mirror-surface plate 36 increases, so that the thickness of the cavity C becomes t1.

When a disc to be molded is thin, the cavity ring 71*b* is attached to the mirror-surface plate 36, and the guide ring spacer 74*b* is attached to the guide ring 18, as shown in FIG. 11. As a result, the amount of projection of the cavity ring 71*b* from the mirror-surface plate 36 decreases, so that the thickness of the cavity C becomes t2.

The present invention is not limited to the above-described embodiments. Numerous modifications and variations of the present invention are possible in light of the spirit of the present invention, and they are not excluded from the scope of the present invention.

What is claimed is:

1. A disc molding die comprising:

(a) a stationary platen;

(b) a movable platen disposed so as to face said stationary platen and adapted to be advanced and retracted by a die clamping apparatus;

(c) a stationary base plate attached to said stationary platen;

(d) a movable base plate attached to said movable platen;

(e) a stationary mirror-surface plate attached to said stationary base plate;

(f) a movable mirror-surface plate attached to said movable base plate;

(g) a stationary guide ring attached to said stationary base plate so as to surround said stationary mirror-surface plate;

(h) a movable guide ring attached to said movable base plate so as to surround said movable mirror-surface plate and adapted to contact with said stationary guide ring in a die clamp state;

(i) a cavity ring detachably attached to one of said stationary and movable mirror-surface plates such that said cavity ring projects toward the other of said stationary and movable mirror-surface plates; and (j) abutment position adjusting means for adjusting a position where said movable guide ring abuts on said stationary guide ring, in accordance with the thickness of said cavity ring.

2. A disc molding die according to claim 1, wherein said abutment position adjusting means is a guide ring spacer that is removably disposed between said guide ring and said base plate.

3. A disc molding die according to claim 1, wherein said abutment position adjusting means is a guide ring spacer that is removably disposed between said guide rings.

4. A disc molding die comprising:

(a) a stationary platen;

(b) a movable platen disposed so as to face said stationary platen and adapted to be advanced and retracted by a die clamping apparatus;

(c) a stationary base plate attached to said stationary platen;

(d) a movable base plate attached to said movable platen;

(e) a stationary mirror-surface plate attached to said stationary base plate;

(f) a movable mirror-surface plate attached to said movable base plate;

(g) a stationary guide ring attached to said stationary base plate so as to surround said stationary mirror-surface plate;

(h) a movable guide ring attached to said movable base plate so as to surround said movable mirror-surface plate and adapted to contact with said stationary guide ring in a die clamp state; and (i) a cavity ring detachably attached to one of said stationary and movable mirror-surface plates such that said cavity ring projects toward the other of said stationary and movable mirror-surface plates, wherein (j) said guide ring is replaced with a different one in accordance with the thickness of said cavity ring so as to adjust the abutment position of said guide ring.

* * * * *